United States Patent [19]

Takeuchi

[11] 3,997,477
[45] Dec. 14, 1976

[54] CATALYST FOR REFORMING HYDROCARBON FUEL

[75] Inventor: Yukihisa Takeuchi, Aichi, Japan

[73] Assignee: Nippon Soken, Inc., Japan

[22] Filed: Nov. 28, 1975

[21] Appl. No.: 636,293

[30] Foreign Application Priority Data

Dec. 11, 1974  Japan .......................... 44-142806
Aug. 29, 1975  Japan .......................... 50-105249

[52] U.S. Cl. .......................... 252/465; 252/466 J; 252/477 R
[51] Int. Cl.² .................. B01J 21/04; B01J 23/26; B01J 23/72; B01J 23/74
[58] Field of Search .................. 252/465, 466 J; 423/213.2, 213.5

[56]     References Cited
UNITED STATES PATENTS 3,751,386   8/1973   Koberstein et al. ............... 252/465
3,907,964   9/1975   Whitman et al. ................. 423/213.2

Primary Examiner—W. J. Shine
Attorney, Agent, or Firm—Cushman, Darby & Cushman

[57]     ABSTRACT

A catalyst for reforming a hydrocarbon fuel to a hydrogen-rich gas comprises a γ-alumina carrier, a layer of at least one of iron trioxide and chrominum trioxide coated on substantially all of surface of the γ-alumina carrier, and at least one metal of nickel and copper, if necessary, together with cobalt, supported on said layer. The reforming can be carried out in a wider composition range at the minimum reforming temperature of not higher than 400° C.

9 Claims, 9 Drawing Figures

CATALYST FOR REFORMING HYDROCARBON FUEL

This invention relates to a catalyst for reforming hydrocarbon fuel into a gas rich in hydrogen and carbon monoxide.

As a means for reducing carbon monoxide, hydrocarbon and nitrogen oxides, which are harmful substances in the exhaust gas from internal combustion engines, it is well known to add to a fuel-air mixture hydrogen that can be stably combusted in a wide range of air-fuel ratio, for combustion of fuel at a lower air-fuel ratio. The hydrogen to be added is prepared by decomposing methyl alcohol. That is, decomposition of methyl alcohol is carried out by utilizing the heat of exhaust gas from the internal combustion engines. It is well known that temperature of the exhaust gas from the internal combustion engines changes in a wide range from approximately room temperature to about 800° C, and therefore an efficient catalyst capable of reforming methyl alcohol in a wide range of temperature from relative low to higher ones is required.

As such a type of catalyst, a Cu catalyst holding copper (which will be hereinafter referred to as "Cu") on a carrier of γ-alumina (which will be hereinafter referred to as "γ-$Al_2O_3$") in a hydrogen atmosphere, a Ni catalyst holding nickel (which will be hereinafter referred to as "Ni") on a carrier of γ-$Al_2O_3$ in a hydrogen atmosphere, and a Cu-Ni catalyst holding Ni and Cu on a carrier of γ-$Al_2O_3$ in a hydrogen atmosphere have been so far used. These catalysts can sufficiently reform methyl alcohol in a wide range of temperature from relatively low to higher ones at their initial stages, but the temperature range for sufficiently reforming methyl alcohol is shifted to a narrow range restricted to high temperatures with their prolonged use. This is a problem for these prior art catalysts.

The present inventor has made various studies to solve this problem, and has found the following fact. When, for example, a Cu catalyst is used in reforming methyl alcohol for a prolonged time, Cu of the Cu catalyst is oxidized by air, etc. supplied at the reforming of methyl alcohol, forming CuO (copper oxide). The CuO thus formed combines with γ-$Al_2O_3$ as the carrier, forming a spinel structure of CuO—$Al_2O_3$. Once the spinal structure is formed, CuO is not reduced to the original Cu by the hydrogen gas generated at the reforming, and consequently the proportion of Cu on γ-$Al_2O_3$ is decreased, and the catalytic action of Cu is lowered. As a result, the temperature range for sufficiently reforming methyl alcohol is shifted to a narrow range restricted to high temperatures, as described above. Same results as for the Cu catalyst hold also for the Ni catalyst and the Cu—Ni catalyst.

An object of the present invention is to solve the foregoing problem. That is, the present invention provides a catalyst comprising γ-$Al_2O_3$, a layer of at least one of iron trioxide and chromium trioxide coated on substantially all the surface of γ-$Al_2O_3$, and at least one metal of Cu and Ni supported on said layer. The layer of at least one of iron trioxide and chromium trioxide suppresses formation of the spinel structure, and ensures sufficient reforming of hydrocarbon fuel including methyl alcohol in a wide range of temperature from a relatively low to higher ones.

In the present invention, iron trioxide (which will be hereinafter referred to as "$Fe_2O_3$") and chromium trioxide (which will be hereinafter referred to as "$Cr_2O_3$") are used for the following reasons: $Fe_2O_3$ and $Cr_2O_3$ have the same structures as that of γ-$Al_2O_3$, form no spinel structure with γ-$Al_2O_3$, and are stable even at a relatively high temperature, for example, 800° C. Especially, $Fe_2O_3$ and $Cr_2O_3$ hardly form the spinel structure by reaction with CuO and NiO, and thus the catalytic action of Cu, Ni or both is never lowered.

In the present invention, the hydrocarbon fuel means such hydrocarbons as gasoline, light oil, etc., but in addition to these, methyl alcohol and higher alcohols are deemed herein as the hydrocarbon fuel.

In the present invention, substantially all the surface of γ-$Al_2O_3$ is coated with a layer of at least one of $Fe_2O_3$ and $Cr_2O_3$ (which will be hereinafter referred to as "$Fe_2O_3$ and/or $Cr_2O_3$"), and thus it is very less that at least one metal of Cu and Ni (which will be hereinafter referred to as "Cu and/or Ni") is directly supported on γ-$Al_2O_3$. That is, even if Cu and Ni are oxidized to CuO and NiO, respectively, it is very less to form a spinel structure of CuO and/or NiO with γ-$Al_2O_3$, and the catalytic action of Cu and/or Ni is hardly lowered.

The present invention will be described in detail, referring to examples and the accompanying drawings.

FIGS. 8 and 9 are characteristic diagrams obtained when the present catalysts and the conventional catalysts are used for reforming a three-component system of water-methyl alcohol-hydrocarbon.

Figure 1:
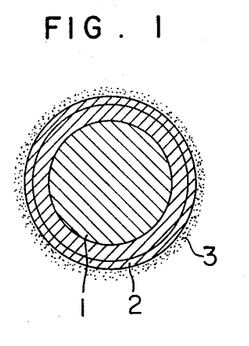
FIG. 1 is a cross-sectional view of the present catalyst in a granular structure.

In FIG. 1, a cross-sectional structure of the present catalyst in a granular form is depicted.

The surface of carrier 1 consisting of granular γ-$Al_2O_3$ is coated with a layer 2 consisting of $Fe_2O_3$ and/or $Cr_2O_3$, and the layer 2 is permeated into the inside of the carrier 1. A catalytic metal 3 of Cu and/or Ni is supported on the layer 2.

EXAMPLE 1

Granular γ-$Al_2O_3$ carriers are dipped in an aqueous solution of 1.5 M $Fe(NO_3)_2 \cdot 9H_2O$ for 15 to 20 minutes, and then dried and calcined, whereby the surfaces of γ-$Al_2O_3$ carriers are coated with a layer of $Fe_2O_3$. Then, the carriers are dipped in an aqueous 2.5 M $Cu(NO_3)_2 \cdot 6H_2O$ solution for 15 to 20 minutes, and then dried and calcined, whereby CuO is supported on the layer of $Fe_2O_3$. Then, the carriers are subjected to hydrogen reduction at about 200° C to reduce CuO to Cu, and a Cu catalyst is obtained thereby.

EXAMPLE 2

Granular γ-Al$_2$O$_3$ carriers are dipped in an aqueous 1.5 M Cr$_2$O$_3$ solution for 15 to 20 minutes, and then dried and calcined, whereby the surfaces of the γ-Al$_2$O$_3$ carriers are coated with a layer of Cr$_2$O$_3$. Then, the carriers are dipped in an aqueous mixed solution of 2.5 M Cu(NO$_3$)$_2$.6H$_2$O and 2.5 M Ni(NO$_3$).6H$_2$O for 15 to 20 minutes, and then dried and calcined, whereby CuO and NiO are supported on the layer of Cr$_2$O$_3$. The carriers can be dipped at first in an aqueous solution of 2.5 M Cu(NO$_3$)$_2$.6H$_2$O and then in an aqueous solution of 2.5 M Ni (NO$_3$)$_2$.6H$_2$. Then, the carriers are subjected to hydrogen reduction at about 200° C to reduce CuO and NiO to Cu and Ni, respectively, and a Cu—Ni catalyst is obtained thereby.

EXAMPLE 3

Granular γ-Al$_2$O$_3$ carriers are dipped in an aqueous mixed solution of 1.5 M Fe(NO$_3$)$_2$.9H$_2$O and 1.5 M Cr$_2$O$_3$ for 15 to 20 minutes, and then dried and calcined, whereby the surfaces of the γ-Al$_2$O$_3$ carriers are coated with a layer of Fe$_2$O$_3$ and Cr$_2$O$_3$. Then, the γ-Al$_2$O$_3$ carriers are dipped in an aqueous mixed solution of 2.5 M Cu(NO$_3$)$_2$.6H$_2$O and 0.5 M Co(NO$_3$)$_2$.6H$_2$O for 15 to 20 minutes, and then dried and calcined, whereby CuO and CoO are supported on the layer of Fe$_2$O$_3$ and Cr$_2$O$_3$. Then, the carriers are subjected to hydrogen reduction at about 200° C to reduce CuO and CoO to Cu and Co, respectively, and a Cu—Co catalyst is obtained thereby.

EXAMPLE 4

Granular γ-Al$_2$O$_3$ carriers are dipped in an aqueous mixed solution of 1.5 M Fe(NO$_3$)$_2$.9H$_2$O and 1.5 M Cr$_2$O$_3$ for 15 to 20 minutes, and then dried and calcined, whereby the surfaces of γ-Al$_2$O$_3$ carriers are coated with a layer of Fe$_2$O$_3$ and Cr$_2$O$_3$. Then, the γ-Al$_2$O$_3$ carriers coated with the layer of Fe$_2$O$_3$ and Cr$_2$O$_3$ are dipped in an aqueous mixed solution of 2.5 M Cu(NO$_3$)$_2$.6H$_2$O, 2.5 M Ni(NO$_3$)$_2$.6H$_2$O and 0.5 M Co(NO$_3$)$_2$ for 15 to 20 minutes, and then dried and calcined, whereby CuO, NiO and CoO are supported on the layer of Fe$_2$O$_3$ and Cr$_2$O$_3$. Then, the carriers are subjected to hydrogen reduction at about 200° C to reduce CuO, NiO and CoO to Cu, Ni, and Co, respectively, and a Cu—Ni—Co catalyst is obtained thereby.

EXAMPLE 5

Granular γ-Al$_2$O$_3$ carriers are dipped in an aqueous solution of 1.5 M Fe(NO$_3$)$_2$.9H$_2$O for 15 to 20 minutes, and then dried, and calcined, whereby the surfaces of the γ-Al$_2$O$_3$ carriers are coated with a layer of Fe$_2$O$_3$. Then, the γ-Al$_2$O$_3$ carriers coated with the layer of Fe$_2$O$_3$ are dipped in an aqueous mixed solution of 2.5 M Cu(NO$_3$)$_2$.6H$_2$O, 2.5 M Ni(NO$_3$)$_2$.6H$_2$O and 0.5 M Co(NO$_3$)$_2$ for 15 to 20 minutes, and then dried, and calcined, whereby CuO, NiO, and CoO are supported on the layer of Fe$_2$O$_3$. Then, the carriers are subjected to hydrogen reduction at about 200° C to reduce CuO, NiO and CoO to Cu, Ni and Co, respectively, and a Cu—Ni—Co catalyst is obtained thereby.

EXAMPLE 6

Granular γ-Al$_2$O$_3$ carriers are dipped in an aqueous solution of 1.5 M Fe(NO$_3$)$_2$.9H$_2$O for 15 to 20 minutes, and then dried, and calcined, whereby the surfaces of the γ-Al$_2$O$_3$ carriers are coated with a layer of Fe$_2$O$_3$. Then, the carriers are dipped in an aqueous mixed solution of 2.5 M Cu(NO$_3$)$_2$.6H$_2$O and 0.5 M Co(NO$_3$)$_2$.6H$_2$O for 15 to 20 minutes, and then dried, and calcined, whereby CuO and CoO are supported on the layer of Fe$_2$O$_3$. Then, the carriers are subjected to hydrogen reduction at about 200° C to reduce CuO and CoO to Cu and Co, respectively, and a Cu—Co catalyst is obtained thereby.

EXAMPLE 7

Granular γ-Al$_2$O$_3$ carriers are dipped in an aqueous solution of 1.5 M Fe(NO$_3$)$_2$.9H$_2$O for 15 to 20 minutes, and then dried, and calcined, whereby the surfaces of the γ-Al$_2$O$_3$ carriers are coated with a layer of Fe$_2$O$_3$. Then, the carriers are dipped in an aqueous mixed solution of 2.5 M Cu(NO$_3$)$_2$.6H$_2$O and 2.5 M Ni(NO$_3$)$_2$.6H$_2$O for 15 to 20 minutes, and then dried, and calcined, whereby CuO and NiO are supported on the layer of Fe$_2$O$_3$. The carriers can be dipped, at first, in an aqueous solution of 2.5 M Cu(NO$_3$)$_2$.6H$_2$O, and then in an aqueous solution of 2.5 M Ni(NO$_3$)$_2$. 6H$_2$O. Then, the carriers are subjected to hydrogen reduction at about 200° C to reduce CuO and NiO to Cu and Ni, respectively, and a Cu—Ni catalyst is obtained thereby.

EXAMPLE 8

Granular γ-Al$_2$O$_3$ carriers are dipped in an aqueous solution 1.5 M Cr$_2$O$_3$ for 15 to 20 minutes, and then dried, and calcined, whereby the surfaces of the γ-Al$_2$O$_3$ carriers are coated with a layer of Cr$_2$O$_3$. Then, the carriers are dipped in an aqueous solution of 2.5 M Cu(NO$_3$)$_2$.6H$_2$O for 15 to 20 minutes, and then dried, and calcined, whereby CuO is supported on the layer of Cr$_2$O$_3$. Then, the carriers are subjected to hydrogen reduction at about 200° C to reduce CuO to Cu, and a Cu catalyst is obtained thereby.

EXAMPLE 9

Granular γ-Al$_2$O$_3$ carriers are dipped in an aqueous solution of 1.5 M Cr$_2$O$_3$ for 15 to 20 minutes, and then dried, and calcined, whereby the surfaces of the γ-Al$_2$O$_3$ carriers are coated with a layer of Cr$_2$O$_3$. Then, the carriers are dipped in an aqueous mixed solution of 2.5 M Cu(NO$_3$)$_2$.6H$_2$O and 0.5 M Co(NO$_3$)$_2$.6H$_2$O for 15 to 20 minutes, and then dried, and calcined, whereby CuO and CoO are supported on the layer of Cr$_2$O$_3$. Then, the carriers are subjected to hydrogen reduction at about 200° C to reduce CuO and CoO to Cu and Co, respectively, and a Cu—Co catalyst is obtained thereby.

EXAMPLE 10

Granular γ-Al$_2$O$_3$ carriers are dipped in an aqueous solution of 1.5 M Cr$_2$O$_3$ for 15 to 20 minutes, and then dried, and calcined, whereby the surfaces of the γ-Al$_2$O$_3$ carriers are coated with a layer of Cr$_2$O$_3$. Then, the carriers are dipped in an aqueous mixed solution of 2.5 M Cu(NO$_3$)$_2$.6H$_2$O, 2.5 M Ni(NO$_3$)$_2$.6H$_2$O and 0.5 M Co(NO$_3$)$_2$.6H$_2$O for 15 to 20 minutes, and then dried, and calcined, whereby CuO, NiO, and CoO are supported on the layer of Cr$_2$O$_3$. Then, the carriers are subjected to hydrogen reduction at about 200° C to reduce CuO, NiO and CoO to Cu, Ni, and Co, respectively, and a Cu—Ni—Co catalyst is obtained thereby.

EXAMPLE 11

Granular γ-Al$_2$O$_3$ carriers are dipped in an aqueous mixed solution of 1.5 M Fe(NO$_3$)$_2$.9H$_2$O and 1.5 M $Cr_2O_3$ for 15 to 20 minutes, and then dried, and calcined, whereby the surfaces of the $\gamma$-$Al_2O_3$ carriers are coated with a layer of $Fe_2O_3$ and $Cr_2O_3$. Then, the carriers are dipped in an aqueous solution of 2.5 M $Cu(NO_3)_2 \cdot 6H_2O$ for 15 to 20 minutes, and then dried, and calcined, whereby CuO is supported on the layer of $Fe_2O_3$ and $Cr_2O_3$. Then, the carriers are subjected to hydrogen reduction at about 200° C, and a Cu catalyst is obtained thereby.

EXAMPLE 12

Granular $\gamma$-$Al_2O_3$ carriers are dipped in an aqueous mixed solution of 1.5 M $Fe(NO_3)_2 \cdot 9H_2O$ and 1.5 $Cr_2O_3$ for 15 to 20 minutes, and then dried, and calcined, whereby the surfaces of the $\gamma$-$Al_2O_3$ carriers are coated with a layer of $Fe_2O_3$ and $Cr_2O_3$. Then, the carriers are dipped in an aqueous mixed solution of 2.5 M $Cu(NO_3)_2 \cdot 6H_2O$ and 2.5 M $Ni(NO_3)_2 \cdot 6H_2O$ for 15 to 20 minutes, and then dried, and calcined, whereby CuO and NiO are supported on the layer of $Fe_2O_3$ and $Cr_2O_3$. The carriers may be dipped, at first, in an aqueous solution of 2.5 M $Cu(NO_3)_2 \cdot 6H_2O$, dried and calcined, and then dipped in an aqueous solution of 2.5 M $Ni(NO_3)_2 \cdot 6H_2O$. Then, the carriers are subjected to hydrogen reduction at about 200° C to reduce CuO and NiO to Cu and Ni, respectively, and a Cu—Ni catalyst is obtained thereby.

EXAMPLE 13

Granular $\gamma$-$Al_3O_2$ carriers are dipped in an aqueous solution of 1.5 M $Cr_2O_3$ for 15 to 20 minutes, and then dried, and calcined, whereby the surfaces of the $\gamma$-$Al_2O_3$ carriers are coated with a layer of $Cr_2O_3$. Then, the carriers are dipped in an aqueous solution of 2.5 M $Ni(NO_3)_2 \cdot 6H_2O$ for 15 to 20 minutes, and then dried and calcined, whereby the surfaces of the $\gamma$-$Al_2O_3$ carriers are coated with a layer of $Cr_2O_3$. Then, the carriers are dipped in an aqueous solution of 2.5 M $Ni(NO_3)_2 \cdot 6H_2O$ for 15 to 20 minutes, and then dried, and calcined, whereby NiO is supported on the layer of $Cr_2O_3$. Then, the carriers are subjected to hydrogen reduction at about 200° C to reduce NiO to Ni, and a Ni catalyst is obtained thereby.

EXAMPLE 14

Granular $\gamma$-$Al_2O_3$ carriers are dipped in an aqueous mixed solution of 1.5 M $Cr_2O_3$ and 1.5 M $Fe_2(NO_3)_2 \cdot 9H_2O$ for 15 to 20 minutes, and then dried, and calcined, whereby the surfaces of the $\gamma$-$Al_2O_3$ carriers are coated with a layer of $Cr_2O_3$ and $Fe_2O_3$. Then, the carriers are dipped in an aqueous solution of 2.5 M $Ni(NO_3)_2 \cdot 6H_2O$ for 15 to 20 minutes, and then, dried, and calcined, whereby NiO is supported on the layer of $Cr_2O_3$ and $Fe_2O_3$. Then, the carriers are subjected to hydrogen reduction at about 200° C to reduce NiO to Ni, and a Ni catalyst is obtained thereby.

EXAMPLE 15

Granular $\gamma$-$Al_2O_3$ carriers are dipped in an aqueous solution of 1.5 M $Fe(NO_3)_2 \cdot 9H_2O$ for 15 to 20 minutes, and then dried, and calcined, whereby the surfaces of the $\gamma$-$Al_2O_3$ carriers are coated with a layer of $Fe_2O_3$. Then, the carriers are dipped in an aqueous solution of 2.5 M $Ni(NO_3)_2 \cdot 6H_2O$ for 15 to 20 minutes, and then dried and calcined, whereby NiO is supported on the layer of $Fe_2O_3$. Then, the carriers are subjected to hydrogen reduction at about 200° C to reduce NiO to Ni, and a Ni catalyst is obtained thereby.

EXAMPLE 16

Granular $\gamma$-$Al_2O_3$ carriers are dipped in an aqueous solution of 1.5 M $Cr_2O_3$ for 15 to 20 minutes, and then dried, and calcined, whereby the surfaces of the $\gamma$-$Al_2O_3$ carriers are coated with a layer of $Cr_2O_3$. Then, the carriers are dipped in an aqueous mixed solution of 2.5 M $Ni(NO_3)_2 \cdot 6H_2O$ and 0.5 M $Co(NO_3)_2 \cdot 6H_2O$ for 15 to 20 minutes, and then dried, and calcined, whereby NiO and CoO are supported on the layer of $Cr_2O_3$. Then, the carriers are subjected to hydrogen reduction at about 200° C to reduce NiO and CoO to Ni and Co, and a Ni—Co catalyst is obtained thereby.

EXAMPLE 17

Granular $\gamma$-$Al_2O_3$ carriers are dipped in an aqueous solution of 1.5 M $Fe(NO_3)_2 \cdot 9H_2O$ for 15 to 20 minutes, and then dried, and calcined, whereby the surfaces of the $\gamma$-$Al_2O_3$ carriers are coated with a layer of $Fe_2O_3$. Then, the carriers are dipped in an aqueous mixed solution of 2.5 M $Ni(NO_3)_2 \cdot 6H_2O$ and 0.5 M $Co(NO_3)_2 \cdot 6H_2O$ for 15 to 20 minutes, and dried, and calcined, whereby NiO and CoO are supported on the layer of $Fe_2O_3$. Then, the carriers are subjected to hydrogen reduction at about 200° C to reduce NiO and CoO to Ni and Co, and a Ni—Co catalyst is obtained thereby.

EXAMPLE 18

Granular $\gamma$-$Al_2O_3$ carriers are dipped in an aqueous mixed solution of 1.5 M $Cr_2O_3$ and 1.5 M $Fe(NO_3)_2 \cdot 9H_2O$ for 15 to 20 minutes, and then dried, and calcined, whereby the surfaces of the $\gamma$-$Al_2O_3$ carriers are coated with a layer of $Cr_2O_3$ and $Fe_2O_3$. Then, the carriers are dipped in an aqueous mixed solution of 2.5 M $Ni(NO_3)_2 \cdot 6H_2O$ and 0.5 M $Co(NO_3)_2 \cdot 6H_2O$ for 15 to 20 minutes, and then dried, and calcined, whereby NiO and CoO are supported on the layer of $Cr_2O_3$ and $Fe_2O_3$. Then, the carriers are subjected to hydrogen reduction at about 200° C to reduce NiO and CoO to Ni and Co, and a Ni—Co catalyst is obtained thereby.

In the foregoing Examples 1 to 18, $Fe_2O_3$ and/or $Cr_2O_3$ are also reduced in the hydrogen reduction step, but the amounts of $Fe_2O_3$ and/or $Cr_2O_3$ reduced are very small. In the foregoing Examples 1 to 18, the drying is carried out at 100° to 120° C for 1 to 2 hours, and the calcination is carried out at 550° to 650° C for 1.5 to 2.5 hours in the drying and calcination steps.

The effects of the present catalysts disclosed in the foregoing Examples 1 to 18 will be described, referring to the accompanying drawings.

Figure 2:
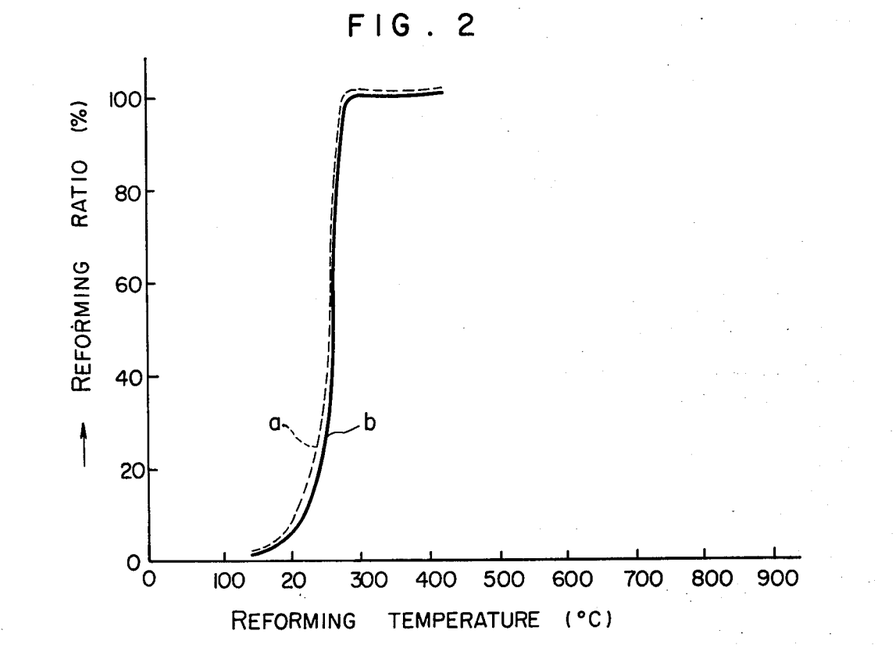
FIG. 2 is a characteristic diagram showing relations between minimum reforming temperature and reforming ratio at the initial stage when the present catalyst and the conventional catalyst are used in reforming methyl alcohol.

In FIG. 2, a characteristic diagram is shown, which indicates experimental results as to what the minimum temperature is for sufficiently (almost 100%) reforming methyl alcohol at the initial stage reforming of methyl alcohol, where characteristic curve a refers to the conventional, well known Cu catalyst (wherein Cu is directly supported on $\gamma$-$Al_2O_3$ carriers), and characteristic curve b refers to the catalysts of the foregoing Examples 1 to 18. That is, characteristic curves should have been plotted for each catalyst of Examples 1 to 18, but it has been experimentally confirmed that all of the catalysts of Examples 1 to 18 have almost equal characteristics. Thus, an average characteristic of the catalysts of Examples 1 to 18 is given by characteristic curve b. The characteristics of the conventional Ni catalyst and Cu—Ni catalyst are quite similar to that of the conventional Cu catalyst, and thus are not shown in FIG. 2.

Figure 3:
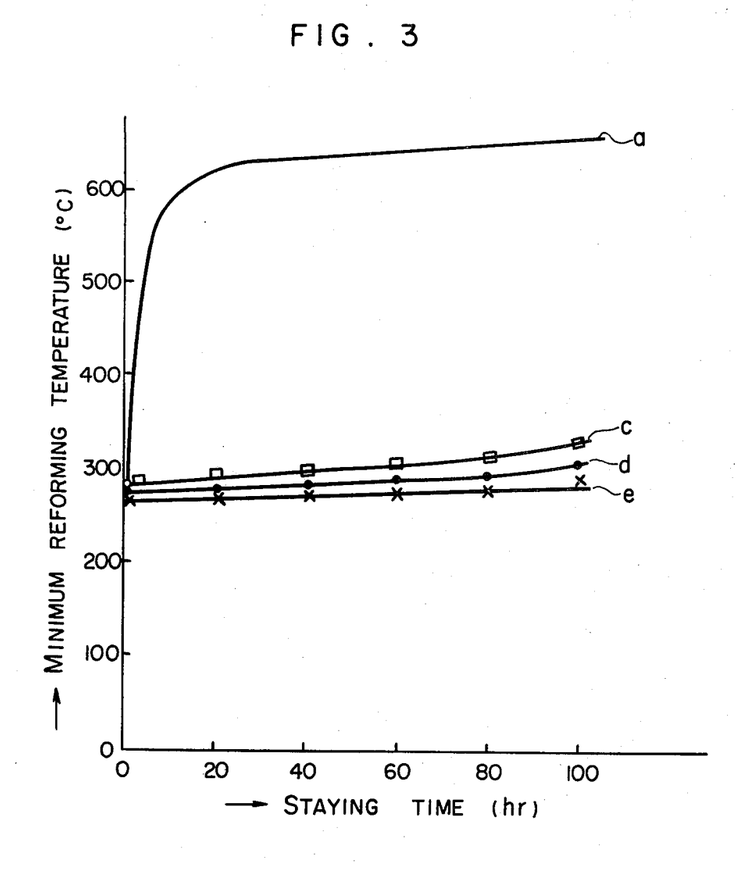
FIGS. 3 and 4 are characteristic diagrams showing relations between staying time and minimum reforming temperature when the present catalyst and the conventional catalyst are used, after the staying test, in reforming methyl alcohol.

In FIG. 3, a characteristic diagram is shown, which indicates staying time test results as to what the minimum reforming temperature is for sufficiently reforming methyl alcohol at the reforming of methyl alcohol with the present catalyst of Examples 1 to 4, and said conventional Cu catalyst after they are disposed in an electric furnace maintained at such a high temperature as 800° C for a predetermined time, where characteristic curve $a$ relates to the conventional Cu catalyst, characteristic curve $c$ the catalyst of Example 1, characteristic curve $d$ the catalysts of Example 2 and Example 4, and characteristic curve $e$ the catalyst of Example 3.

Figure 4:
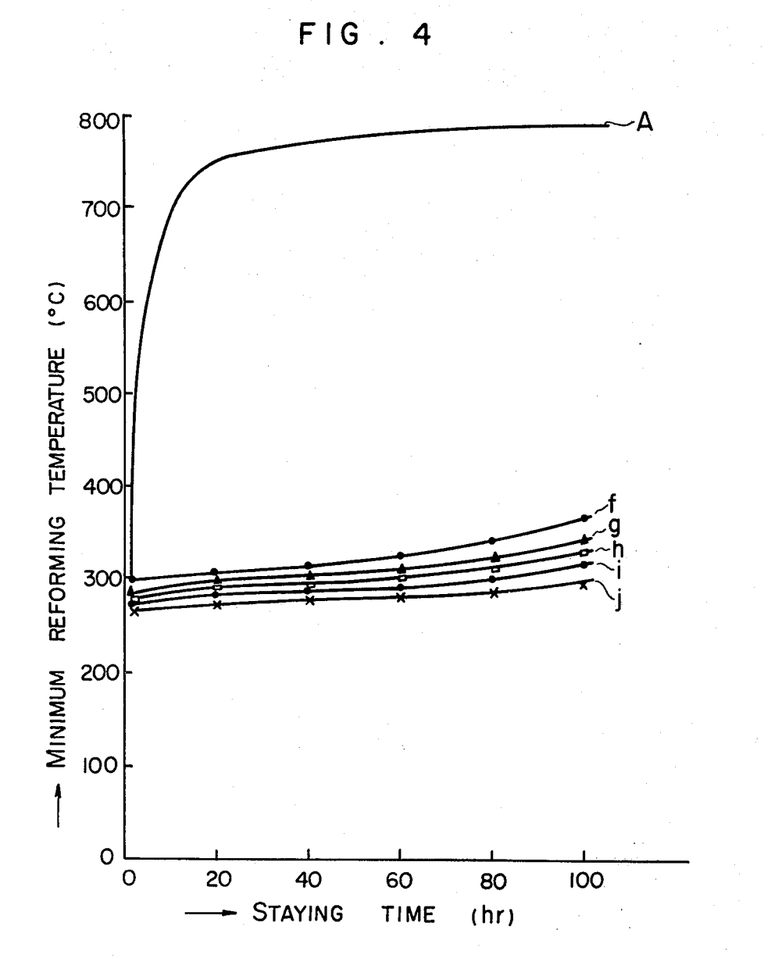

In FIG. 4, a characteristic diagram is shown, which indicates staying time test results as to what the minimum temperature is for sufficiently reforming methyl alcohol at the reforming of methyl alcohol with the present catalysts of Examples 5 to 18, and the conventional Ni catalyst after they are disposed in an electric furnace maintained at such a high temperature as 800° C for a predetermined time, where characteristic curve A refers to the conventional Ni catalyst, characteristic curve $f$ catalysts of Examples 13 to 15, characteristic curve $g$ catalysts of Examples 8, 11, and 16 to 18, characteristic curve $h$ catalysts of Examples 6 and 9, characteristic curve $o$ catalysts of Examples 7 and 12, and characteristic curve $j$ catalysts of Examples 5 and 10.

As is apparent from FIG. 2, the present catalysts and the conventional Cu catalysts have almost similar characteristics in the state at the initial stage, and the minimum temperature for sufficiently reforming methyl alcohol are about 280° C for the present catalysts and the conventional Cu catalyst, but it is apparent from FIG. 3 that the minimum reforming temperature of the conventional Cu catalyst is very high, for example, 600° C, after the catalyst has been disposed in the electric furnace at such a high temperature as 800° C for 20 hours.

As apparent from FIG. 4, the minimum reforming temperature for the conventional Ni catalyst is also very high, for example, about 750° C after the catalyst has been disposed in the electric furnace at 800° C for 20 hours, though the conventional Ni catalyst can sufficiently reform methyl alcohol at about 280° C by the staying time test, that is, in the state at the initial stage.

On the other hand, as apparent from FIGS. 3 and 4, the minimum reforming temperatures of the present catalysts are only by about 50° C higher after the staying time than in the state at the initial stage, though there are small differences among Examples 1 to 18. The present catalysts are much distinguished from the conventional catalysts. This means that the present catalyst can reform methyl alcohol in a wide temperature range of from a relatively low temperature (about 280° C) to a higher temperature (800° C).

The reason why the present catalysts are distinguished from the conventional catalysts is that the layer of $Fe_2O_3$ and/or $Cr_2O_3$ coated on the $\gamma$-$Al_2O_3$ carrier prevents formation of spinel structure of Cu, Ni, Ni—Co, Cu—Ni, Cu—Co, or Cu—Ni—Co with $\gamma$-$Al_2O_3$.

The amount of $Fe_2O_3$ and/or $Cr_2O_3$ to be coated as a layer on the $\gamma$-$Al_2O_3$ carriers, and amount of Cu, Ni, Ni—Co, Cu—Ni, or Cu—Ni—Co to be supported on the layer of $Fe_2O_3$ and/or $Cr_2O_3$ are determined in the following manner in view of the performance of the catalyst. That is, as a result of extensive studies of the present catalysts made by the present inventor, the amounts each of $Fe_2O_3$, $Cr_2O_3$, Cu, Ni, Ni—Co, Cu—Ni, Cu—Co, and Cu—Ni—Co in the deposit supported on the $\gamma$-$Al_2O_3$ carriers are as follows, where percentage is by weight. For Example 1, 20 to 49% of $Fe_2O_3$, and the remaining 80 to 51% being Cu; for Example 2, 20 to 49% of $Cr_2O_3$, 35% or less of Cu and 61% or more of Ni; for Example 3, 20 to 49% of $Fe_2O_3$ + $Cr_2O_3$, 35% or more of Cu, and 12% or less of Co; for Example 4, 20 to 49% of $Fe_2O_3$ + $Cr_2O_3$, 35% or more of Cu, 61% or less of Ni, and 12% or less of Co; for Example 5, 20 to 49% of $Fe_2O_3$, 35% or more of Cu, 61% or less of Ni, and 12% or less of Co; for Example 6, 20 to 49% by $Fe_2O_3$, 35% or more of Cu, and 12% or less of Co; for Example 7, 20 to 49% of $Fe_2O_3$, 35% or more of Cu, and 61% or less of Ni; for Example 8, 20 to 49% of $Cr_2O_3$, and 80 to 51% of Cu; for Example 9, 20 to 49% of $Cr_2O_3$, 35% or more of Cu, and 12% or less of Co; for Example 10, 20 to 49% of $Cr_2O_3$, 35% or less of Cu, 61% or less of Ni, and 12% or less of Co; for Example 11, 20 to 49% of $Fe_2O_3$ + $Cr_2O_3$, and 80 to 51% of Cu; for Example 12, 20 to 49% of $Fe_2O_3$ + $Cr_2O_3$ 35% or more of Cu, and 61% of less of Ni.

In the case of Ni catalyst the required amount of Ni is larger than the amount of Cu in the case of the Cu catalyst. That is, for Example 13, 20 to 27% of $Cr_2O_3$, and 80 to 73% of Ni; for Example 14, 20 to 27% of $Cr_2O_3$ + $Fe_2O_3$, and 80 to 73% of Ni; for Example 15, 20 to 27% of $Fe_2O_3$, and 80 to 73% of Ni; for Example 16, 20 to 27% of $Cr_2O_3$, 73% or more of Ni, and 10% or less of Co; for Example 17, 20 to 27% of $Fe_2O_3$, 73% or more of Ni, and 10% or less of Co; for Example 18, 20 to 27% of $Cr_2O_3$ + $Fe_2O_3$, 73% or more of Ni, and 10% or less of Co.

In any of the foregoing examples, the amounts each of the components are adjusted in said ranges to make 100% in total. In the foregoing Examples 1 to 12, all the surfaces of the $\gamma$-$Al_2O_3$ are not completely coated with $Fe_2O_3$ and/or $Cr_2O_3$, if the single amount of $Fe_2O_3$ or $Cr_2O_3$ or total amount of both $Fe_2O_3$ and $Cr_2O_3$ is less than 20%, and a proportion of Cu or Ni and Co added to Cu, which is directly supported on the $\gamma$-$Al_2O_3$ carriers, is increased. When these metals are oxidized into oxide forms by the air supplied at the reformation of methyl alcohol, the resulting oxides are liable to form a spinel structure with $\gamma$-$Al_2O_3$, as described above, and the action of $Fe_2O_3$ and/or $Cr_2O_3$ to suppress the formation of the spinel structure is not made sufficiently. On the other hand, all the surfaces of the $\gamma$-$Al_2O_3$ carriers are completely coated with $Fe_2O_3$ and/or $Cr_2O_3$, when said single amount of $Fe_2O_3$ or $Cr_2O_3$, or total amount of both $Fe_2O_3$ and $Cr_2O_3$ is more than 49%, but the minimum reforming temperature of methyl alcohol is influenced by the amount of $Fe_2O_3$ and/or $Cr_2O_3$, and becomes relatively high. To assure the coating amount of 20 to 49%, the appropriate concentrations each of said $Fe(NO_3)_2 \cdot 9H_2O$ and $Cr_2O_3$ is 0.5 to 1.5 M.

In the foregoing Examples 13 to 18, the single amount of $Fe_2O_3$ or $Cr_2O_3$, or total amount of both $Fe_2O_3$ and $Cr_2O_3$ is 20 to 27%. When the amount is less than 20%, all the surfaces of the $\gamma$-$Al_2O_3$ carriers are not completely coated by $Fe_2O_3$ and/or $Cr_2O_3$, and a proportion of direct contact of $\gamma$-$Al_2O_3$ with Ni or Ni—Co is increased. That is, the action of $Fe_2O_3$ and/or $Cr_2O_3$ to suppress the formation of the spinel structure is not made sufficiently. When the amount is more than 27% on the other hand, a proportion of Ni or Ni—Co to take on the carriers becomes smaller, and consequently, the catalytic action of Ni or Ni—Co is lowered, and the minimum reforming temperature of methyl alcohol becomes relatively high.

In the catalysts of the foregoing Examples 1 to 18, the amounts of Cu, or Ni and Co to be added to Cu, and the amounts of Ni or Co to be added to Ni are within the ranges as described above, and the minimum reforming temperature of methyl alcohol can be made lower than 300° C by keeping said amounts within said ranges.

The present inventor has made studies of other metals than Co as metals to be added to Cu and/or Ni, but it has been found that other metals than Co considerably increase the minimum reforming temperature of methyl alcohol and are not suitable. The action of Co added is to lower the minimum reforming temperature of methyl alcohol, but when Co is added in too large an amount, the minimum reforming temperature of methyl alcohol is considerably increased. The addition of Co in such too large an amount is not preferable. The minimum reforming temperature of methyl alcohol can be made lower than 300° C by keeping the amount of Co to be added within the ranges as described in the foregoing Examples.

In the preparation of the present catalysts of Examples 1 to 18, nitrates of Fe, Cu, Ni and Co are used as the starting materials of $Fe_2O_3$, Cu, Ni, and Co to be supported on the $\gamma$-$Al_2O_3$ carriers, but it has been found that other salts than the nitrates, for example, their sulfates can be used.

The present catalysts of Examples 1 to 18, are the catalysts of the so-called granular structure using granular $\gamma$-$Al_2O_3$ carriers, but the present catalysts are not restricted to the granular structure. For example, the present catalyst can take a ceramic honeycomb structure, where $\gamma$-alumina is deposited on the surfaces of cordierite material, or a metal honeycomb structure, where $\gamma$-alumina is deposited on surfaces of metal by melt spraying, or a metal wire structure, where $\gamma$-alumina is deposited on fine metal wires.

In the foregoing description, the present invention is restricted to the examples of applying the present catalysts only to reforming of methyl alcohol, but the present catalysts can be also applied to reforming an aqueous methyl alcohol solution, hydrocarbon fuel, and higher alcohols. In the reforming of these materials, the minimum reforming temperature for sufficient reforming is a little higher than the minimum reforming temperature for only methyl alcohol, but it has been confirmed that the minimum reforming temperature is lower than the minimum reforming temperature obtained by the conventional catalyst having no layer of $Fe_2O_3$ and/or $Cr_2O_3$ coated on the surfaces of $\gamma$-$Al_2O_3$ carriers. Furthermore, it has been confirmed that the staying property at a relatively high temperature is better than that of the conventional catalyst.

Figure 5:
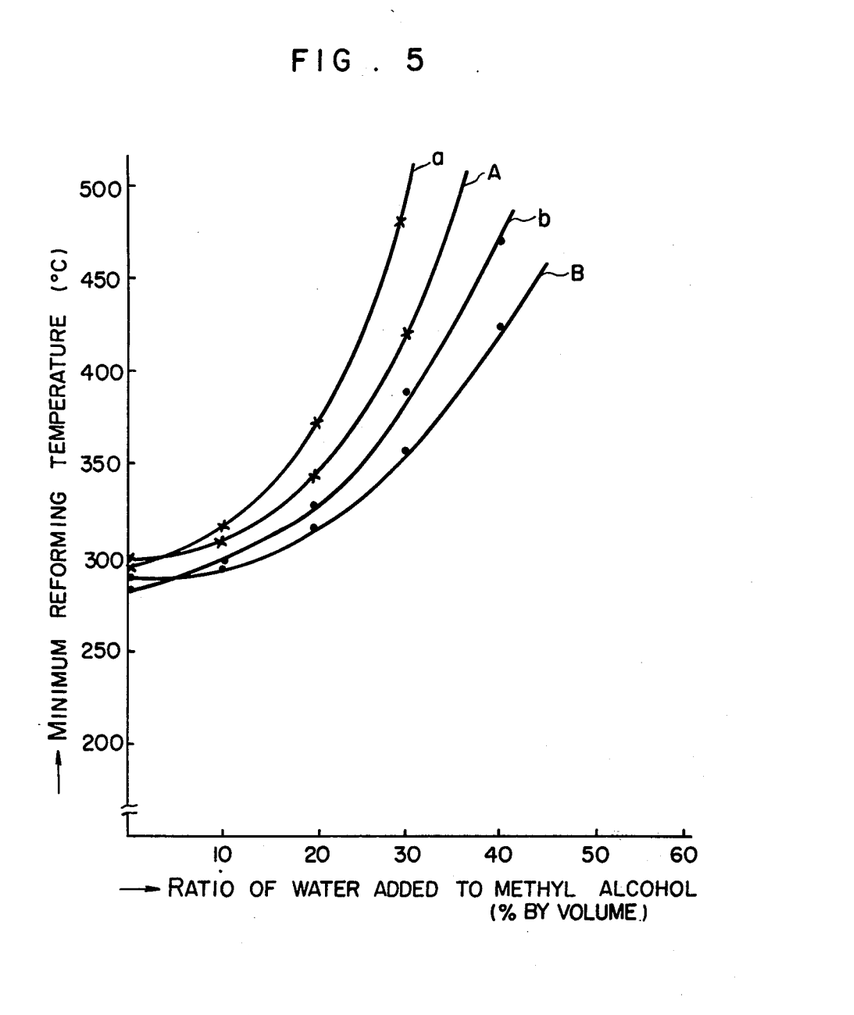
FIG. 5 is a characteristic diagram showing relations between ratios of water added to methyl alcohol and minimum reforming temperature when the present catalysts and the conventional catalysts are used.

In FIG. 5, a characteristic diagram is shown, which indicates how the minimum reforming temperature for sufficiently reforming an aqueous methyl alcohol solution is changed by the composition of the aqueous methyl alcohol solution and the kinds of the catalysts, where characteristic curve $a$ refers to said conventional Cu catalyst, characteristic curve A said conventional Ni catalyst, characteristic curve $b$ an average characteristic of the foregoing Examples 1 to 12, and characteristic curve B an average characteristic of the foregoing Examples 13 to 18. It is seen from FIG. 5 that the minimum reforming temperatures of the conventional Cu catalyst, the conventional Ni catalyst, and the present catalysts are increased with increasing amount of water to be added to methyl alcohol. When it is desired to effectively utilize the heat of exhaust gas in the reforming reaction where hydrogen is used as fuel for internal combustion engine, a composition whose minimum reforming temperature exceeds 400° C is difficult in an industrial scale practice. The composition reformable at 400° C is 77% by volume of methyl alcohol (the percentage hereinafter referred to is by volume, unless otherwise indicated) and 23% of water for the conventional Cu catalyst; 72% of methyl alcohol and 28% of water for the conventional Ni catalyst, whereas 68% of methyl alcohol and 32% of water for the present catalysts of Examples 1 to 12; 63% of methyl alcohol and 37% of water for the present catalysts of Examples 13 to 18. It is seen that the compositions reformable at 400° C by the present catalysts are not reformable by the conventional Cu catalyst and Ni catalyst unless the reforming temperature is considerably higher than 400° C. As described above, the present catalysts can reform an aqueous methyl alcohol solution at a lower temperature than that for the conventional Cu catalyst and Ni catalysts, and furthermore have a wider range of composition of the aqueous methyl alcohol solution reformable at a temperature of not higher than 400° C. Furthermore, it is seen that the present catalysts of Examples 13 to 18 have wider ranges of reformable composition of the aqueous methyl alcohol solution than the present catalysts of Examples 1 to 12.

Figure 6:
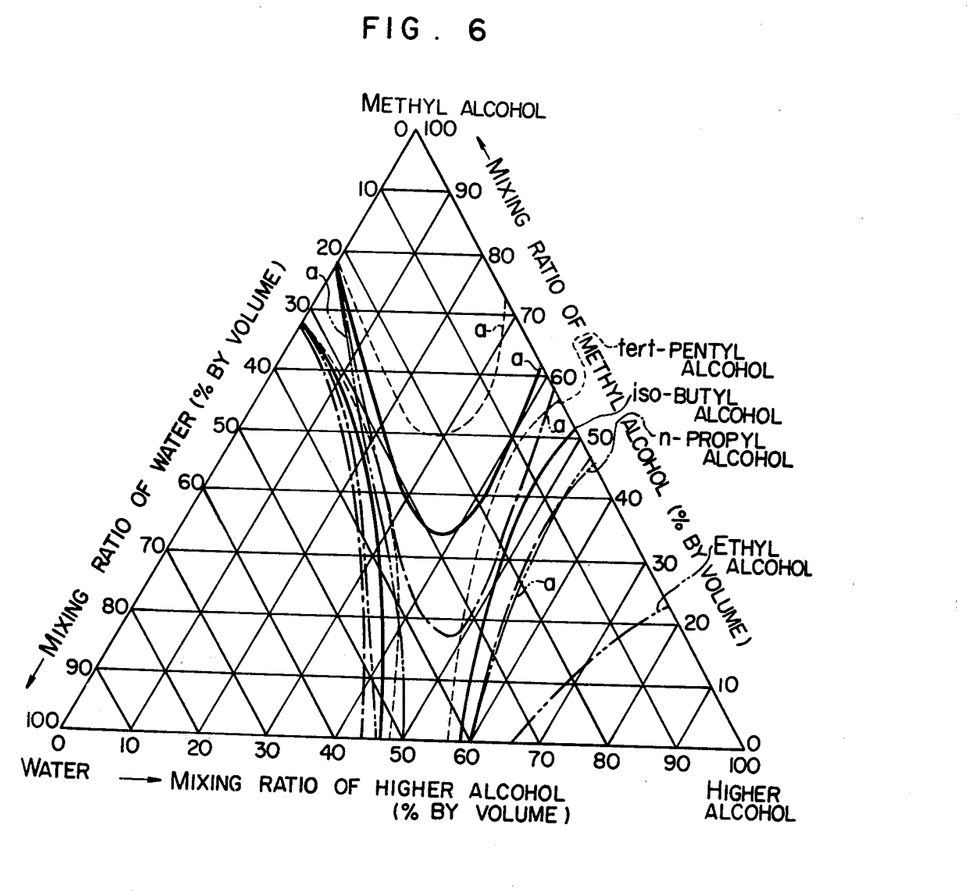
FIGS. 6 and 7 are characteristic diagrams obtained when the present catalysts and the conventional catalysts are used for reforming a three-component system of water-methyl alcohol-higher alcohol.
Figure 7:
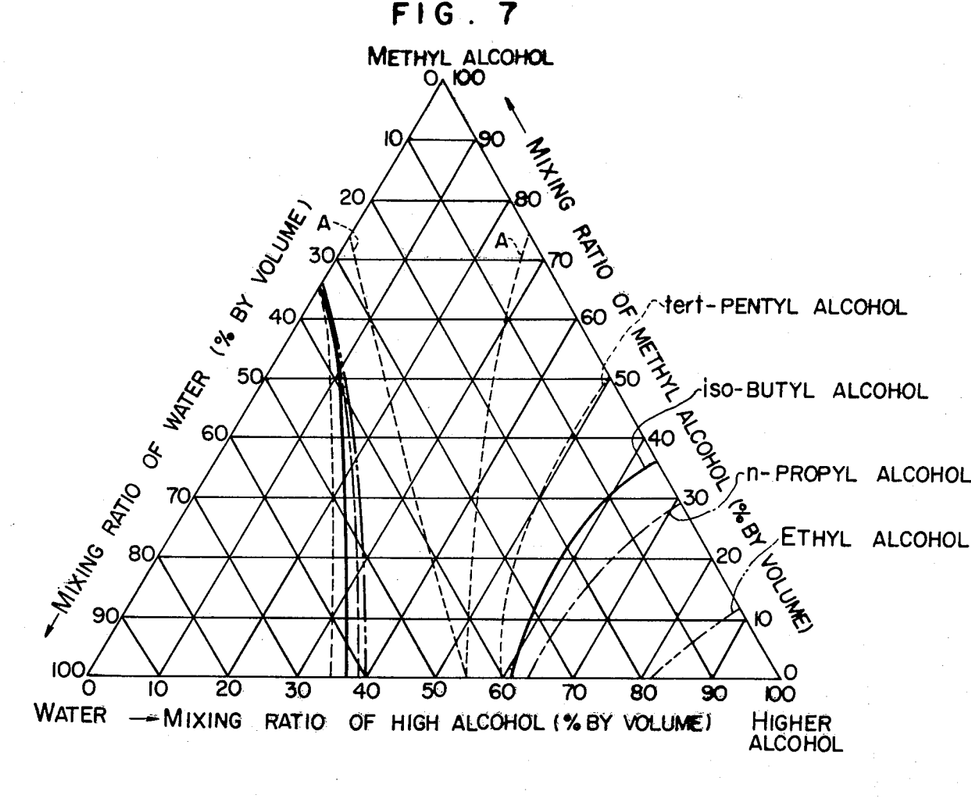

In FIGS. 6 and 7, sufficiently reformable composition ranges of a mixed solution of methyl alcohol-water-higher alcohol, which are reformed by the present catalysts of Examples 1 to 18, the conventional Cu catalyst and Ni catalyst at a relatively low temperature of not higher than 400° C at L.H.S.V of 2 or more $hr^{-1}$, are shown, where tert.-pentyl alcohol, iso-butyl alcohol, n-propyl alcohol and ethyl alcohol are used as typical higher alcohols. In FIG. 6, characteristic curves $a$ refer to the conventional Cu catalyst, and other characteristic curves average characteristics of the present catalysts of Examples 1 to 14, where the conventional Cu catalyst is used for reforming an aqueous mixed solutions of water-methyl alcohol-tert.-pentyl alcohol, water-methyl alcohol-iso-butyl alcohol, water-methyl alcohol-iso-butyl alcohol, water-methyl alcohol-n-propyl alcohol, and water-methyl alcohol-ethyl alcohol. In FIG. 7, characteristic curve A refers to the conventional Ni catalyst, and other characteristic curves average characteristics of the present catalysts of Examples 13 to 18, where the conventional Ni catalyst is used only for reforming an aqueous mixed solution of water-methyl alcohol-tert. pentyl alcohol.

As is apparent from FIGS. 6 and 7, the composition ranges reformable at temperatures of not higher than 400° C depend upon the kinds of the higher alcohols. It is also seen from FIGS. 6 and 7 that the compositions of water-higher alcohols are reformable. For example, on a line between water and higher alcohol in FIG. 6, the reformable composition of ethyl alcohol-water is 46 to 67% of ethyl alcohol, and the remaining 54 to 33% is water. Also, the compositions of methyl alcohol-higher alcohol are reformable. For example, on a line between methyl alcohol and higher alcohol in FIG. 6, the reformable composition of tert.-pentyl alcohol-methyl alcohol is 43% of tert.-pentyl alcohol and 57% of methyl alcohol.

It is seen from FIGS. 6 and 7 that the reformable composition ranges of a mixed solution of water-methyl alcohol-tert. pentyl alcohol by the conventional Cu catalyst and Ni catalyst are much narrower than the reformable composition ranges of a mixed solution of water-methyl alcohol-tert. pentyl alcohol by the present catalysts. It is also seen from comparison of characteristics of the conventional Cu catalyst and Ni catalyst with the present catalysts in FIGS. 6 and 7 that the reformable composition ranges of other higher alcohols than tert. pentyl alcohol, for example, isobutyl alcohol, n-propyl alcohol and ethyl alcohol by the conventional Cu catalyst and Ni catalyst are narrower than the corresponding reformable composition ranges by the present catalysts, which has been confirmed by the tests made by the present inventor.

It is also seen from comparison of FIG. 6 with FIG. 7 that the present catalysts of Examples 13 to 18 have wider reformable composition ranges than the present catalysts of Examples 1 to 12. Other higher alcohols than those mentioned above can be utilized, but it has been found that the reformable composition range will be narrower with increasing carbon atoms of the higher alcohol.

Figure 9:
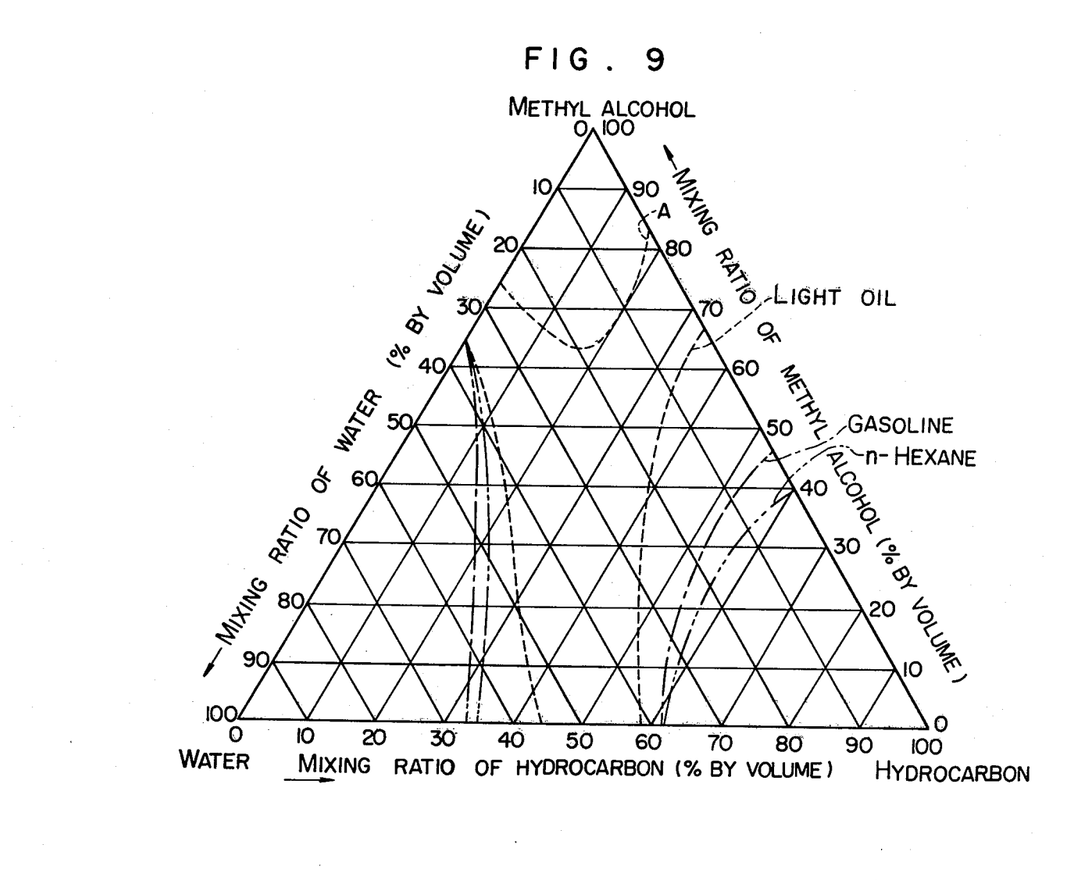

In FIGS. 8 and 9, sufficiently reformable composition ranges of mixed solutions of methyl alcohol-water-hydrocarbon, which are reformed by the present catalysts of Examples 1 to 18, the conventional Cu catalyst and Ni catalyst at a relatively low temperature of not higher than 400° C at L.H.S.V of 2 or more $hr^{-1}$, are shown, where n-hexane, light oil and gasoline are used as typical hydrocarbon. In FIG. 8, characteristic curves a refer to the conventional Cu catalyst, and other characteristic curves average characteristics of the present catalysts of Examples 1 to 12, where the conventional Cu catalyst is used for reforming mixed solutions of methyl alcohol-water-n-hexane, methyl alcohol-water-gasoline, and methyl alcohol-water-light oil. In FIG. 9, characteristic curve A refers to the conventional Ni catalyst, and other characteristic curves average characteristics of the present catalysts of Examples 13 to 18, where the conventional Ni catalyst is used for reforming only the mixed solution of methyl alcohol-water-light oil.

As is apparent from FIGS. 8 and 9, the reformable composition ranges at temperature of not higher than 400° C depend upon the kinds of hydrocarbon. Even a composition of water-hydrocarbon is also reformable. For example, on a line between water and hydrocarbon in FIG. 8, a reformable composition range of water-n-hexane is 47 to 62% of n-hexane and 53 to 38% of water. Furthermore, a composition of methyl alcohol-hydrocarbon is also reformable. For example, on a line between methyl-alcohol and hydrocarbon in FIG. 8, a reformable composition of methyl alcohol-light oil is 72% of methyl alcohol and 28% of light oil.

Furthermore, it is seen from FIGS. 8 and 9 that reformable ranges become narrower in the order of n-hexane, gasoline and light oil. It is also seen that the reformable composition range of a mixed solution of water-methyl alcohol-light oil by the conventional Cu catalyst and Ni catalyst is much narrower than that by the present catalysts. It is also seen from comparison of the characteristics of the conventional Cu catalyst and Ni catalyst with the present catalysts of FIGS. 8 and 9 that the reformable composition ranges of other hydrocarbons than light oil, for example, gasoline and n-hexane, by the conventional Cu catalyst and Ni catalyst are narrower than those by the present catalysts, which has been confirmed by tests made by the present inventor.

As is apparent from comparison of FIG. 8 with FIG. 9, the present catalysts of Examples 13 to 18 have wider reformable composition ranges than the present catalysts of Examples 1 to 12.

Other hydrocarbons than those mentioned above can be used in the present invention, but it has been found that the reformable composition range will be narrower with increasing carbon atoms of hydrocarbon.

What is cliamed is:

1. A catalyst for reforming a hydrocarbon fuel to a hydrogen-rich gas, which comprises a γ-alumina carrier, a layer of at least one of iron trioxide and chromium trioxide coated on substantially all of surface of the γ-alumina carrier, and at least one metal of nickel and copper supported on said layer.

2. A catalyst according to claim 1, wherein cobalt is added to at least one metal of nickel and copper.

3. A catalyst according to claim 1, wherein said metal is nickel, and an amount of said layer is 20 to 27% by weight and the remaining 80 to 73% by weight is nickel.

4. A catalyst according to claim 1, wherein the metal is copper, and an amount of said layer is 20 to 49% by weight, and the remaining 80 to 51% by weight is copper.

5. A catalyst according to claim 1, wherein the metal is both copper and nickel, and an amount of said layer is 20 to 49% by weight, an amount of nickel 61% by weight or less, and an amount of copper is 35% by weight or more.

6. A catalyst according to claim 2, wherein the metal is nickel, and an amount of the layer is 20 to 27% by weight, an amount of nickel 73% by weight or more, and an amount of cobalt 10% by weight or less.

7. A catalyst according to claim 2, wherein the metal is copper, and an amount of the layer is 20 to 49% by weight, an amount of copper 35% by weight or more, and an amount of cobalt 12% by weight or more.

8. A catalyst according to claim 2, wherein the metal is both nickel and copper, an amount of said layer is 20 to 49% by weight, an amount of nickel 61% by weight or less, an amount of copper 35% by weight or more, and an amount of cobalt 12% by weight or less.

9. A catalyst according to claim 2, wherein the layer is $Cr_2O_3$ or a mixture of $Cr_2O_3$ and $Fe_2O_3$ the metal is nickel, the amount of the layer is 20 to 27% by weight, the amount of nickel is 73% or more by weight and the amount of cobalt is 10% or less by weight.

* * * * *

UNITED STATES PATENT OFFICE
CERTIFICATE OF CORRECTION

Patent No. 3,997,477          Dated December 14, 1976

Inventor(s) Yukihisa TAKEUCHI

It is certified that error appears in the above-identified patent and that said Letters Patent are hereby corrected as shown below:

Column 1, line 59, "chromium trioxide" should be --chromic oxide--.

Column 1, line 68 to Column 2, line 1, "chromium trioxide' should be --chromic oxide--.

Signed and Sealed this

Eighth Day of March 1977

[SEAL]

Attest:

RUTH C. MASON  
Attesting Officer

C. MARSHALL DANN  
Commissioner of Patents and Trademarks

UNITED STATES PATENT OFFICE
CERTIFICATE OF CORRECTION

Patent No. 3,997,477            Dated December 14, 1976

Inventor(s)    Yukihisa TAKEUCHI

It is certified that error appears in the above-identified patent and that said Letters Patent are hereby corrected as shown below:

Abstract, line 3, "chromium trioxide" should be --chromic oxide--.

Col. 1, line 62, "chromium trioxide" should be --chromic oxide--.

Col. 3, line 3, after "1.5 M", "$Cr_2O_3$" should be --$CrO_3$--.

Col. 3, line 21, "$Cr_2O_3$" should be --$CrO_3$--.

Col. 3, line 36, "$Cr_2O_3$" should be --$CrO_3$--.

Col. 4, line 27, "$Cr_2O_3$" should be --$CrO_3$--.

Col. 4, line 40, "$Cr_2O_3$" should be --$CrO_3$--.

Col. 4, line 54, "$Cr_2O_3$" should be --$CrO_3$--.

Col. 5, line 1, "$Cr_2O_3$" should be --$CrO_3$--.

Col. 5, line 13, after "1.5 M", "$Cr_2O_3$" should be --$CrO_3$--.

Col. 5, line 31, "$Cr_2O_3$" should be --$CrO_3$--.

Col. 5, line 47, "$Cr_2O_3$" should be --$CrO_3$--.

Col. 6, line 4, "$Cr_2O_3$" should be --$CrO_3$--.

Col. 6, line 31, "$Cr_2O_3$" should be --$CrO_3$--.

Col. 12, lines 21-22 (claim 1, lines 3-4), "chromium trioxide" should be --chromic oxide--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*